US008726185B1

(12) United States Patent
Zhang et al.

(10) Patent No.: US 8,726,185 B1
(45) Date of Patent: May 13, 2014

(54) METHOD AND APPARATUS FOR RENDERING OVERLAPPED OBJECTS

(71) Applicant: VIA Technologies, Inc., New Taipei (TW)

(72) Inventors: Guo-Feng Zhang, Shanghai (CN); Yi-Fei Zhu, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 13/666,970

(22) Filed: Nov. 2, 2012

(30) Foreign Application Priority Data

Oct. 23, 2012 (CN) .......................... 2012 1 0405662

(51) Int. Cl.
*G06F 3/048* (2013.01)
(52) U.S. Cl.
USPC ....................................... 715/790
(58) Field of Classification Search
None
See application file for complete search history.

(56) References Cited

U.S. PATENT DOCUMENTS

| 7,911,481 | B1 * | 3/2011 | Ballagh et al. | 345/629 |
|---|---|---|---|---|
| 7,956,869 | B1 * | 6/2011 | Gilra | 345/592 |
| 8,327,277 | B2 * | 12/2012 | Thakkar et al. | 715/753 |
| 2006/0001681 | A1 * | 1/2006 | Smith | 345/629 |
| 2007/0101282 | A1 * | 5/2007 | Goossen et al. | 715/764 |
| 2008/0001952 | A1 * | 1/2008 | Srinivasan et al. | 345/502 |
| 2008/0284798 | A1 | 11/2008 | Weybrew et al. | |
| 2008/0288860 | A1 * | 11/2008 | Daviss | 715/243 |
| 2012/0084717 | A1 * | 4/2012 | Yao et al. | 715/792 |

\* cited by examiner

*Primary Examiner* — Matt Kim
*Assistant Examiner* — Maryam Ipakchi
(74) *Attorney, Agent, or Firm* — Jianq Chyun IP Office

(57) ABSTRACT

A method and apparatus for rendering overlapped objects are provided. In the method, multiple objects are sorted according to rendering properties thereof and placed into a source chain. As for a target object in the source chain, an object first overlapped with the target object is successively searched. If no overlapped object is found, the target object is moved to a target chain. Otherwise, a blending object is generated by blending an overlapping area of the target object and overlapped object according to an alpha-blending property thereof and the blending object and all non-overlapping areas of the target object and overlapped object are inserted respectively as a new object into the source chain. The above steps are repeated until all objects in the source chain are moved to the target chain. Finally, the objects in the target chain are rendered on an electronic device.

19 Claims, 8 Drawing Sheets

FIG. 5G

METHOD AND APPARATUS FOR RENDERING OVERLAPPED OBJECTS

CROSS-REFERENCE TO RELATED APPLICATION

This application claims the priority benefit of China application serial no. 201210405662.8, filed on Oct. 23, 2012. The entirety of the above-mentioned patent application is hereby incorporated by reference herein and made a part of this specification.

BACKGROUND OF THE INVENTION

1. Field of the Invention

The invention relates to a rendering method and a rendering apparatus, and more particularly, relates to a method and an apparatus for rendering overlapped objects.

2. Description of Related Art

As computer technology advances rapidly, computer has become one of the most important electronic devices daily used by people nowadays. With the rapid development in software technology, in addition to the speed and functionality, there is also an increasing emphasis on picture quality of the computer. To attract more attention from users, software manufacturers have to provide eye-feasting operating environment for users by producing a more delicate operating interface, other than just developing more innovative functionalities.

In conventional art, operating interface of operating system is displayed right after computer is powered on and entered to operating system. Users may set up a style of desktop and select applications to execute their desired functions via said operating interface. Generally, the selected applications are displayed as windows on the desktop which allows users to switch between applications by clicking on different windows.

While multiple windows are opened by users, due to limitation of display area on a screen of the computer, all windows are overlapped to each other in order to fit into the display area of the screen. The windows are displayed in a layer-by-layer manner on the screen according to a sequence of the windows being opened or used by the users, in which a current window (the one most recently used) is displayed on top of the other windows, which overlaps the other windows. In this case, contents of the overlapped windows (covered by the current window) may not be display on the screen for viewing.

In conventional graphics technology, rendering overlapped windows is managed by dividing the overlapped windows using a multiple-layer method. Multiple pipelines of a computer graphics engine are used to respectively render objects of different layers and display the overlapped portion of the layers using an alpha-blending method. This allows users to see partial contents of the other windows while operating the current window, so that users may switch and operate between different windows.

In order to present an effect of alpha-blending as described above, a background is firstly displayed on the screen by the computer. Then, a first window (i.e. the window at bottom) is rendered after data of background is read. In the rendering of the first window, an alpha-blending calculation is performed according to the alpha-blending parameters of the background and the first window. Then, a result of the alpha-blending calculation is written into a memory, such that a portion of the background may be seen through an alpha-blending portion of the first window. Accordingly, a second window is rendered by the computer after data of background and the first window are re-read. In the rendering of the second window, the alpha-blending calculation is performed according to the alpha-blending parameters of the first window and the second window. Then, a result of the alpha-blending calculation is written into a memory, such that a portion of the background and a portion of the first window may be seen through an alpha-blending portion of the second window. However, when the amount of opened windows is increase, the loading for the computer to perform the alpha-blending calculation may also be increased. Moreover, operations of repeatedly reading/writing memory may occupy too much memory, thereby affecting an overall performance of the computer.

SUMMARY OF THE INVENTION

The invention provides a method for rendering overlapped objects which includes following steps. First, a plurality of objects are sorted according to a rendering property of each of the objects and the sorted objects are placed into a source chain. Next, a target object in the objects of the source chain is selected for successively searching for a next object in the source chain which is an overlapped object to the target object. If no overlapped object is found, the target object is moved to a target chain and the target object in the source chain is removed. If an overlapped object is found, a blending object is generated by blending an overlapping area of the target object and the overlapped object according to an alpha-blending property of the target object and the overlapped object, the blending object and all non-overlapping areas of the target object and the overlapped object are inserted respectively as new objects into the source chain, and the target object and the overlapped object in the source chain are removed. Finally, the objects in the target chain are rendered on an electronic device when all objects in the source chain are moved to the target chain.

The invention provides an apparatus for rendering overlapped objects, which includes a sorting module, a searching module, a blending module and a rendering module. The sorting module sorts the objects to be displayed on the electronic device according to a rendering property of each of the objects and places the sorted objects into a source chain. The searching module is connected to the sorting module for selecting a target object from the objects in the source chain, and successively searching for a next object in the source chain which is an overlapped object to the target object. The blending module is connected to the searching module, wherein if the overlapped object is not found by the searching module, the blending module moves the target object to a target chain and removes the target object from the source chain. If the overlapped object is found by the searching module, the blending module generates a blending object by blending an overlapping area of the target object and the overlapped object according to an alpha-blending property of the target object and the overlapped object, respectively inserts the blending object and all non-overlapping areas of the target object and the overlapped object as new objects into the source chain, and removes the target object and the overlapped object in the source chain. The rendering module is connected to the blending module, and used for rendering the objects in the target chain on the electronic device when all of the objects in the source chain are moved to the target chain by the blending module.

The invention provides a method for rendering overlapped object in a computer system which includes following steps. First, a plurality of windows to be displayed on the computer system are sorted according to a rendering property of each of the windows and the sorted windows are placed to a source chain. Then, a target window in the source chain is selected, and a next window in the source chain which is an overlapped window to the target window is successively searched. If no overlapped window is found, the target window is moved to a target chain and the target window is removed from the source chain. If the overlapped window is found, a blending object is generated by blending an overlapping area of the target window and the overlapped window according to an alpha-blending property of the target window and the overlapped window, the blending object and all non-overlapping areas of the target window and the overlapped window are respectively inserted as a new window into the source chain, and the target window and the overlapped window are removed form the source chain. The windows in the target chain are rendered on the electronic device when all of the windows in the source chain are moved to the target chain.

Based on the above, the method and the apparatus for rendering overlapped objects of the present invention sorts the objects to be displayed according to rendering properties of the objects and performs searching to each object and blending of the overlapping area and merging of non-overlapping areas, in which the objects are then placed into the target chain to save the loading of repeatedly reading/writing memory.

To make the aforementioned and other features and advantages of the invention more comprehensible, several embodiments accompanied with figures are described in detail below.

BRIEF DESCRIPTION OF THE DRAWINGS

FIG. 5A to FIG. 5G are comparative examples of a method for rendering overlapped objects according to an embodiment of the invention.

DESCRIPTION OF THE EMBODIMENTS

In order to reduce occupations of memory bandwidth due to repeatedly reading/writing memory when the graphic processing unit (GPU) is rendering overlapped objects, the invention provides a method to blend overlapping area of objects according to the rendering properties of the objects before the objects are written into the memory. This allows the GPU to render the objects without repeatedly reading/writing the memory and perform an alpha-blending calculation, thereby reducing loading of calculation and memory being occupied.

Figure 1:
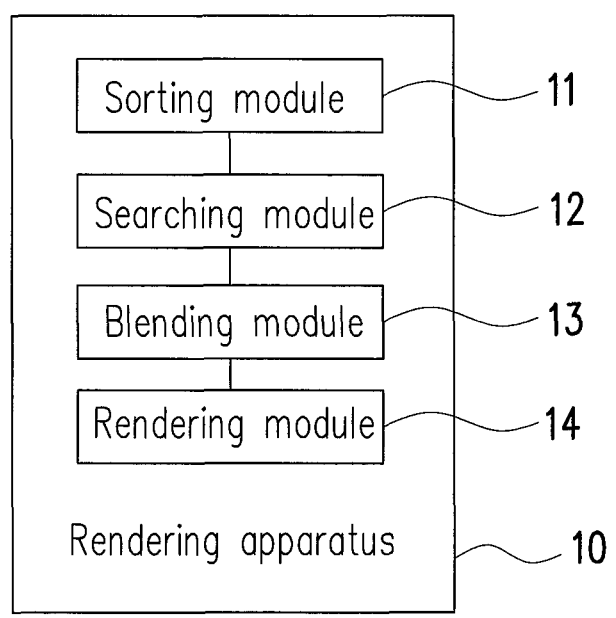
FIG. 1 is a block diagram of an apparatus for rendering overlapped objects according to an embodiment of the invention.
Figure 2:
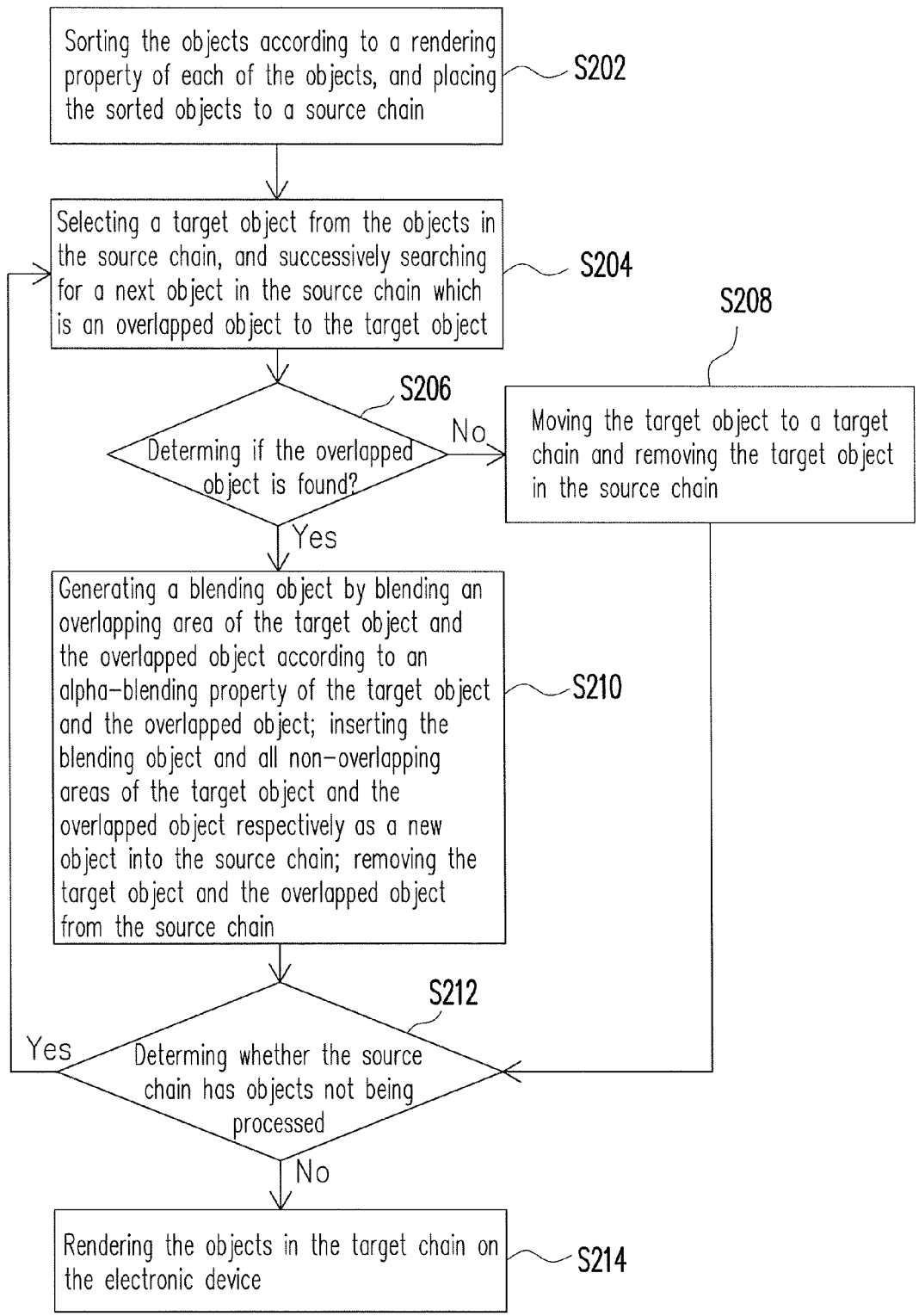
FIG. 2 is a flowchart of a method for rendering overlapped objects according to an embodiment of the invention.
Figure 3:
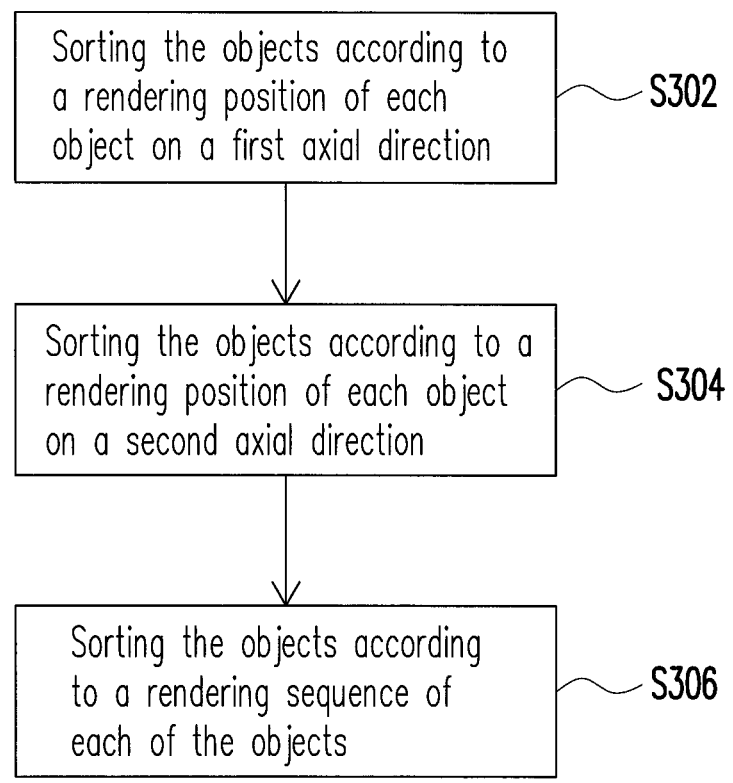
FIG. 3 is a flowchart of a method for sorting overlapped objects according to an embodiment of the invention.

FIG. 1 is a block diagram of an apparatus for rendering overlapped objects according to an embodiment of the invention. FIG. 2 is a flowchart of a method for rendering overlapped objects according to an embodiment of the invention. FIG. 3 is a flowchart of a method for sorting objects according to step 202 of the embodiment of the invention as shown in FIG. 2. Referring to FIG. 1, the rendering apparatus 10 of the present embodiment is, for example, a graphic processing unit (GPU) or other types of processor disposed in an electronic device. The rendering apparatus 10 includes a sorting module 11, a searching module 12, a blending module 13 and a rendering module 14. Detailed steps of the method for rendering of the present embodiment are described as below, with reference to each element of the rendering apparatus in FIG. 1.

When the rendering apparatus 10 receives a plurality of objects and rendering properties thereof, the sorting module 11 sorts the objects according a rendering property of each of the objects, and places the sorted objects into a source chain (Step S202). Said rendering property includes a rendering position of the object on 2-dimensional space and a rendering sequence of the object. The sorting module 11 respectively sorts the objects according to the rendering properties.

More specifically, FIG. 3 is a flowchart of a method for sorting objects according to an embodiment of the invention, which can be used in Step S202. Referring to FIG. 3, the sorting module 11, for example, sorts the objects according to a rendering position of each object on a first axial direction (e.g. the X-axis) (Step S302). The sorting module 11, for example, determines left borders of the objects and compares positions of left borders on the X-axis, and accordingly sorts the objects in a left-to-right order. Next, the sorting module 11 sorts the objects according to a rendering position of each object on a second axial direction (e.g. the Y-axis) (Step S304). The sorting module 11, for example, determines upper borders of the objects and compares positions of upper borders on the Y-axis, and accordingly sorts the objects in an up-to-down order. Finally, the sorting module 11 sorts the objects according to a rendering sequence of each of the objects (Step S306). The sorting module 11, for example, compares the rendering sequence of each object, and sorts the objects in a front-to-back order. By using the sorting method as described above, the rendering apparatus 10 may find and place the objects having positions and rendering sequences closing to each other together, which is favorable to the subsequent step of searching for the overlapped objects.

Next, the searching module 12 selects a target object from the plurality of objects in the source chain, and successively searches for a next object in the source chain which is an overlapped object to the target object (Step S204). Next, the searching module 12 determines if the overlapped object is found (Step S206). More specifically, the searching module 12, for example, sets a first object in the source chain as the target object and starts searching for the overlapped object. During the searching process, the searching module 12 searches the overlapped object to the target object starting with a first object after target object in the source chain. If no overlapped object is found by the searching module 12, the blending module 13 directly moves the target object to a target chain and removes the target object from the source chain (Step S208).

If the overlapped object is found by the searching module 12, the blending module 13 generates a blending object by blending an overlapping area of the target object and the overlapped object according to an alpha-blending property of the target object and the overlapped object, respectively inserts the blending object and all non-overlapping areas of the target object and the overlapped object as new objects into the source chain, and removes the target object and the overlapped object from the source chain (Step S210).

More specifically, in an embodiment, the blending module 13, for example, generates new objects by performing an alpha-blending calculation to the overlapping area of the target object and overlapped object according to an aspect ratio of the alpha-blending property of the target object and the overlapped object, and places the new objects into the target chain. In another embodiment, the blending module 13 determines whether an alpha property of the target object or the overlapped object is equal to zero (i.e. opaque). If the alpha property of the target object or the overlapped object is equal to zero, this indicates that such object covers all its rear objects in the overlapping area. In this case, the blending module 13 may skip the step of alpha-blending calculation, and directly select the overlapping area of the target object or the overlapped object having the alpha-blending property being zero as the blending object and insert the same back to the source chain again.

It should be noted that, while generating the blending object by blending the target object and the overlapped object, the blending module 1 also blends the rendering properties of the objects. That is, the blending module 13 may provide the blending object with a new rendering position, a new rendering sequence and a new alpha parameter according to the rendering properties of the target object and the overlapped object. Such a new rendering property may be used as a reference for the rendering module 14 to render objects in subsequent process.

Figure 4:
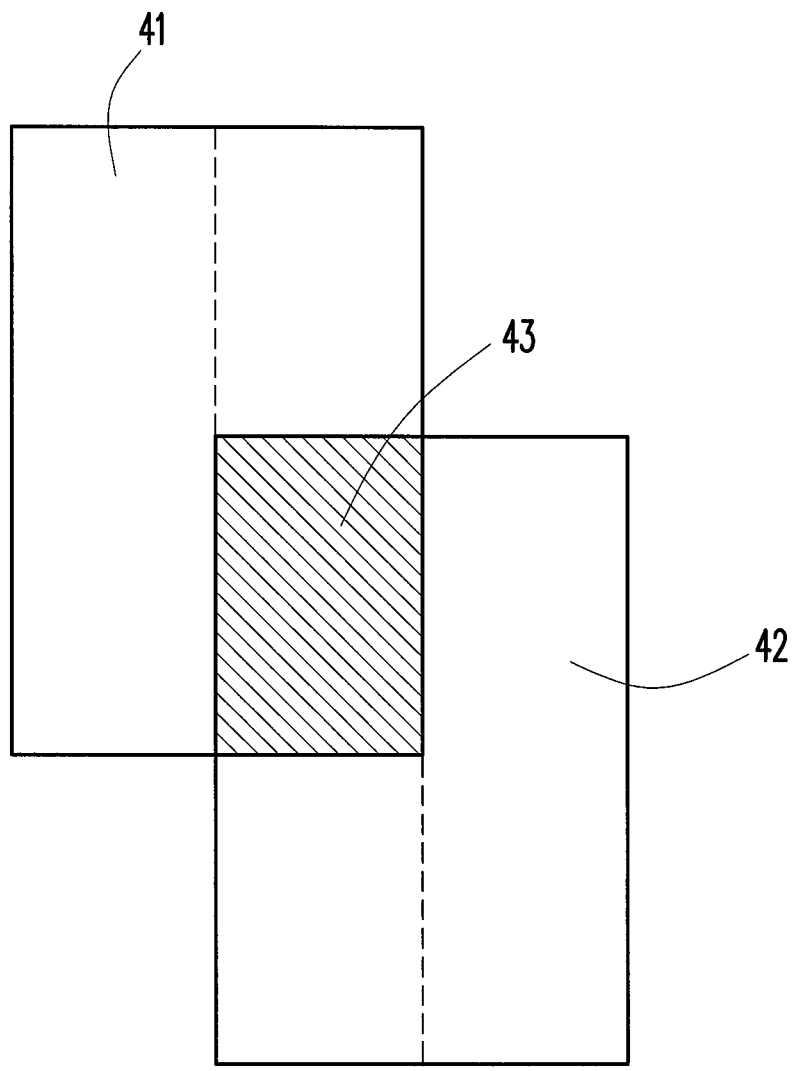
FIG. 4 is an example of blending a target object and an overlapped object according to an embodiment of the invention.

For example, FIG. 4 is an example of blending a target object and an overlapped object according to an embodiment of the invention. Referring to FIG. 4, an overlapping area 43 (i.e. slashed area) is located between a target object 41 and an overlapped object 42. When blending the target object 41 and the overlapped object 42, the rendering apparatus, for example, performs an alpha-blending calculation to an overlapping area 43 of the target object 41 and the overlapped object 42 according to the alpha parameters of the target object 41 and the overlapped object 42 so as to obtain a blending object. Such blending object and all non-overlapped areas (i.e. non-slashed areas) of the target object 41 and overlapped object 42 are selected as new objects and inserted back to the source chain for subsequent process.

It should be noted that, after the image of the overlapping area of the target object and overlapped object has been blended, since it is not clear if the target object and the overlapped object are still overlapping with other objects in the source chain, the target object and the overlapped object are required to be inserted back to the source chain for further determination. When placing the blending object and the non-overlapped areas back to the source chain, to save time for subsequent search, said sorting method may be used to insert those new objects back to proper positions in the source chain according to the rendering properties of the new objects. In addition, the target object, the overlapped object and the overlapping area of above embodiment are exemplified in rectangle-shapes. However, in practical applications, users may divide the areas of the target object and the overlapped object into other shapes based on the demand, instead of being limited by the method of the present embodiment.

Whenever the blending module 13 moves the target object into the target chain, or insert the new objects back into the source chain, the blending module 13 determines whether the source chain has objects not being processed (Step S212). If the source chain has objects not being processed, the flow is back to the step S204, in which the searching module 12 searches a next target object in the source chain again, and successively searches for a next object in the source chain which is an overlapped object to the next target object, so as to move the next target object into the target chain or successively insert the new object generated by the next target object and the overlapped object into the source chain, until all objects in the source chain are moved to the target chain. When the blending module 13 determines that all objects in the source chain are moved to the target chain, rendering module 14 renders all objects in the target chain on the electronic device though the rendering module 14 (Step S214). The rendering module 14 divides the objects in the target chain into a plurality of layers according to, for example, the rendering property of each object, in which the rendering property includes a source texture, a source texture coordinates and a transparency.

Based on the rendering properties of the said layers, in one embodiment, the rendering module 14 may set a plurality of fixed function pipelines to respectively render the objects within the layers, in which each texture corresponds to one layer. It should be noted that, above-said method is a simplest and fastest rendering method. However, since the number of fixed function pipelines is limited, the upper limit of layers for processing is 8 layers. In another embodiment, the rendering module 14 may generate a pixel shader or a fragment shader to respectively render the objects within the layers. Such method is more preferable yet more complicated, and the upper limit of layers for processing is depended on the version of the shader. Generally, the upper limit thereto is 128, which means that a rendering process of 128 layers is supported.

Figure 5A:
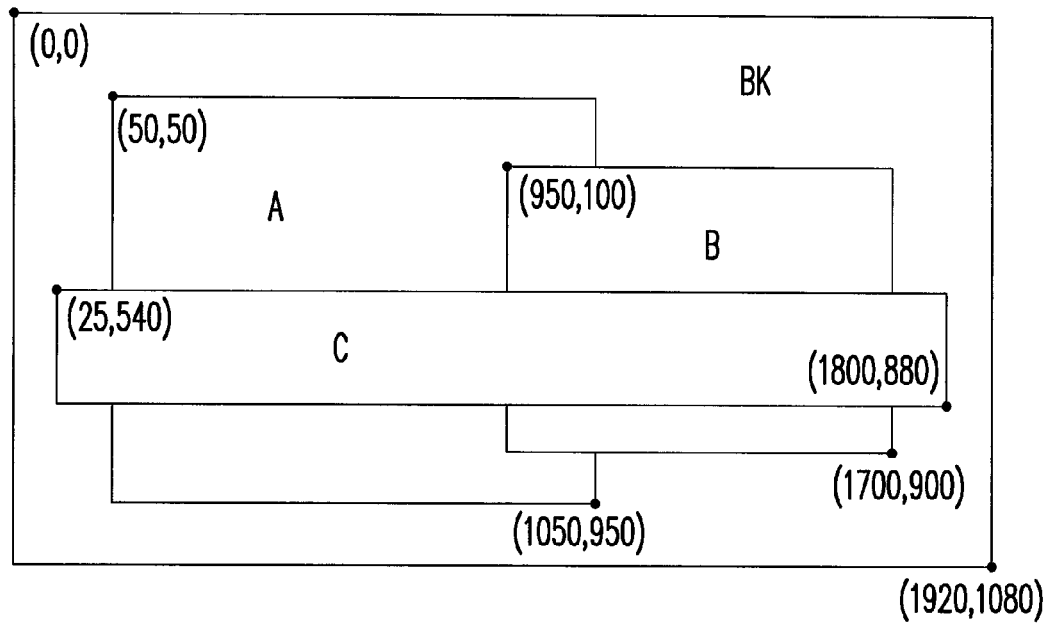

FIG. 5A to FIG. 5G are comparative examples of a method for rendering overlapped objects according to an embodiment of the invention. Referring to FIG. 5A, objects A, B and C are rendered on a background BK, in which the object A is positioned above the background BK, the object B is positioned above the object A and the object C is positioned above the object B. The size of the background BK is 1920*1080 dpi. Assuming that the coordinates of the point on left-top end of the background BK is (0,0), the area covered by the background BK is a rectangle area formed by point (0,0) and point (1920,1080); the object A is a rectangle area formed by point (50,50) and point (1500,950); the object B is a rectangle area formed by point (950,100) and point (1700,900); the object C is a rectangle area formed by point (25,540) and point (1800, 880).

The amount of data required for writing/reading memory using traditional method to render above background and objects are as listed below:

1. Rendering the background BK: writing 1920*1080=207360;

2. Rendering the object A: reading 1000*900 for twice and writing 1000*900 for once, which is a total of 3*1000*900=2700000;

3. Rendering the object B: reading 750*800 for twice and writing 750*800 for once, which is a total of 3*750*800=1800000;

4. Rendering the object C: reading 1775*340 for twice and writing 1775*340 for once, which is a total of 3*1775*340=1810500;

As stated above, the amount of data for reading/writing memory is 8384100.

In comparison to the traditional method, the invention adopts the method of sorting the objects in left-to-right, top-to-bottom, front-to-back orders, such that the objects in FIG. 5A are sorted and placed into the source chain in the following sequence: BK, C, A, B.

Figure 5B:
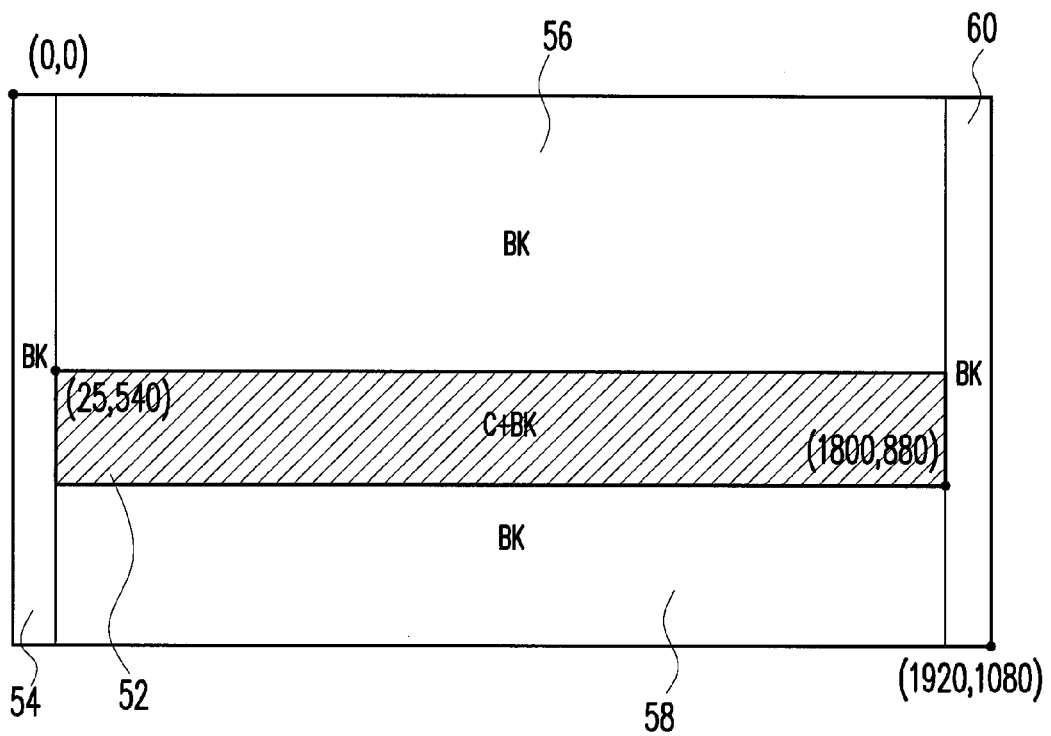

Next, referring to FIG. 5A and FIG. 5B together, the background BK which is at the first position of the source chain is selected as the target object, and the object C is found by successively searching for the object in the source chain which is an overlapped object to the background BK. An overlapping area 52 and non-overlapping areas 54, 56, 58 and 60 are defined based on positions of the background BK and the object C. After an image of the overlapping area 52 (i.e. C+BK) is blended, the overlapping area 52 (the blending object) and the non-overlapping areas 54, 56, 58 and 60 are inserted back into the source chain as new objects. At this time, the sequence of the objects in the source chain is: 54, 56, 52, 58, A, B, 60. Wherein, said non-overlapping areas 54, 56, 58, 60 are divided in a sequence of left-to-right and up-to-bottom, said new objects are also inserted back into the source chain in a sequence of left-to-right and up-to-bottom. However, the invention is not limited thereto. Those skilled in the art may divide or insert the objects in a sequence of up-to-bottom, left-to-right or other sequences according to actual requirement.

Next, selecting the object 54 which is now at the first position of the source chain as the target object, and successively searching for the overlapped object of the target object in the source chain. Since no other objects are overlapped with the object 54, the object 54 may be moved to the target chain. At this time, the sequence of the objects in the source chain is: 56, 52, 58, A, B, 60; the sequence of the objects in the target chain is: 54.

Figure 5C:
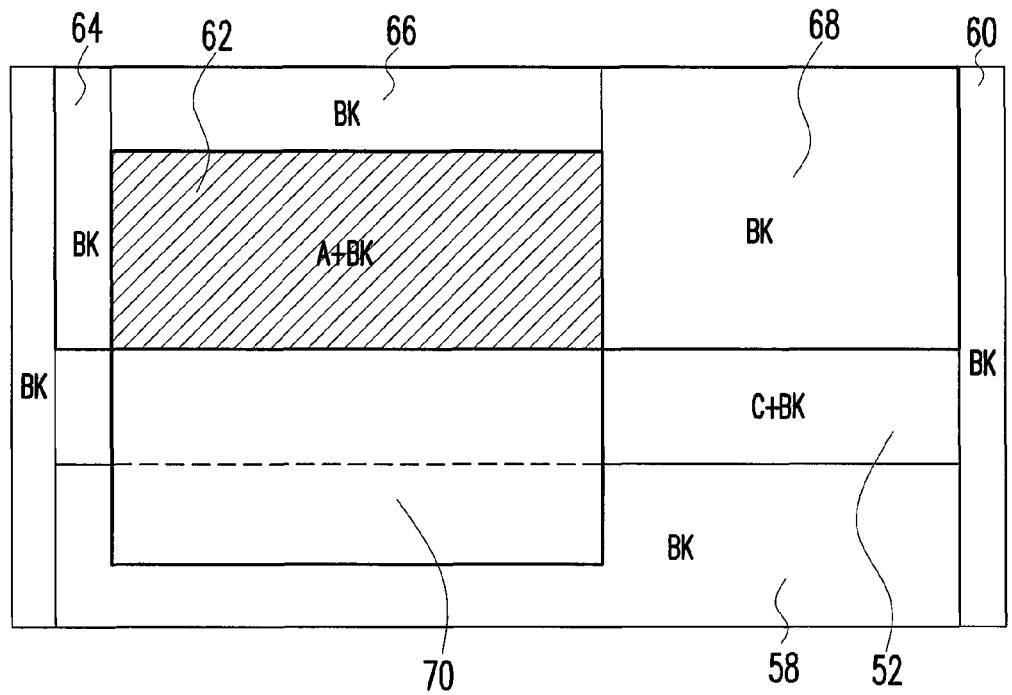

Next, referring to FIG. 5B and FIG. 5C together, the object 56 which is now at the first position of the source chain is selected as the target object, and the object A is found by successively searching for the overlapped object of the target object in the source chain. An overlapping area 62 and non-overlapping areas 64, 66, 68 and 70 are defined based on positions of the object 56 and the object A. After the overlapping area 62 (i.e. A+BK) is blended, the overlapping area 62 (i.e. the blending object) and the non-overlapping areas 64, 66, 68 and 70 are inserted back into the source chain as new objects. At this time, the sequence of the objects in the source chain is: 64, 52, 58, 66, 62, 70, B, 68, 60; and the sequence of the objects in the target chain is: 54.

Next, the object 64 which is now at the first position of the source chain is selected as the target object, and the overlapped object of the target object in the source chain is successively searched. Since no other objects are overlapped with the object 64, the object 64 may be moved to the target chain. At this time, the sequence of the objects in the source chain is: 52, 58, 66, 62, 70, B, 68, 60; and the sequence of the objects in the target chain is: 54, 64.

Figure 5D:
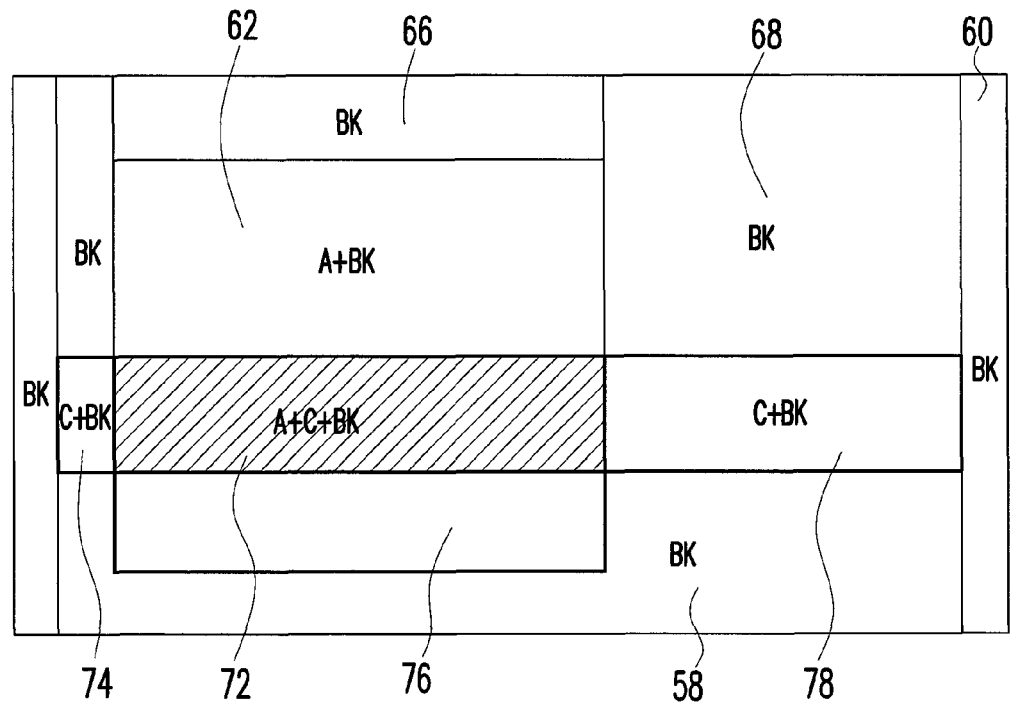

Next, referring to FIG. 5C and FIG. 5D together, the object 52 which is now at the first position of the source chain is selected as the target object, and the object 70 is found by successively searching for the overlapped object of the target object in the source chain. An overlapping area 72 and non-overlapping areas 74, 76 and 78 are defined based on positions of the object 52 and the object 70 (divided in a left-to-right, up-to-down order). After the overlapping area 72 (i.e. A+C+BK) is blended, the overlapping area 72 (i.e. the blending object) and the non-overlapping areas 74, 76 and 78 are inserted back into the source chain as new objects. At this time, the sequence of the objects in the source chain is: 74, 58, 66, 62, 72, 76, B, 68, 78, 60; and the sequence of the objects in the target chain is: 54, 64.

Next, the object 74 which is now at the first position of the source chain is selected as the target object, and the overlapped object of the target object in the source chain is successively searched. Since no other objects are overlapped with the object 74, the object 74 may be moved to the target chain. At this time, the sequence of the objects in the source chain is: 58, 66, 62, 72, 76, B, 68, 78, 60; and the sequence of the objects in the target chain is: 54, 64, 74.

Figure 5E:
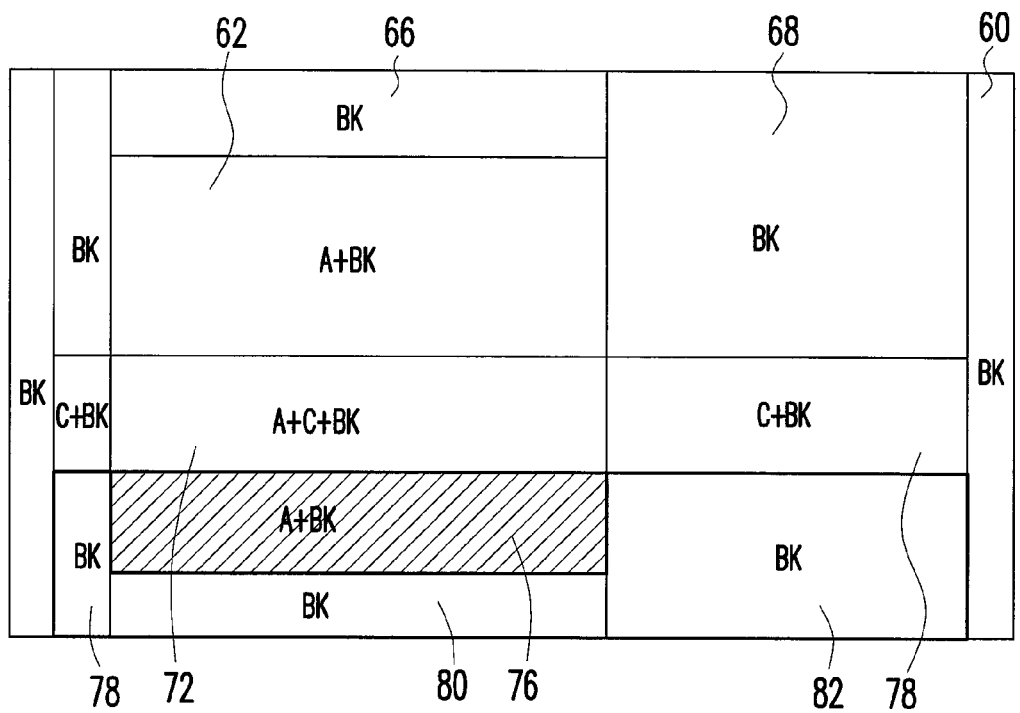

Next, referring to FIG. 5D and FIG. 5E together, the object 58 which is now at the first position of the source chain is selected as the target object, the object 76 is found by successively searching for the overlapped object of the target object in the source chain. An overlapping area 76 and non-overlapping areas 78, 80 and 82 are defined based on positions of the object 58 and the object 76. After the overlapping area 76 (i.e. A+BK) is blended, the overlapping area 76 and the non-overlapping areas 78, 80 and 82 are inserted back into the source chain as new objects. At this time, the sequence of the objects in the source chain is: 78, 66, 62, 72, 76, 80, B, 68, 78, 82, 60; and the sequence of the objects in the target chain is: 54, 64, 74.

Next, the object 78 which is now at the first position of the source chain is selected as the target object, and the overlapped object of the target object in the source chain is successively searched. At this time, the sequence of the objects in the source chain is: 66, 62, 72, 76, 80, B, 68, 78, 82, 60; and the sequence of the objects in the target chain is: 54, 64, 74, 78.

Next, the object 66 which is now at the first position of the source chain is selected as the target object, and the overlapped object of the target object in the source chain is successively searched. Since no other objects are overlapped with the object 66, the object 66 may be moved to the target chain. At this time, the sequence of the objects in the source chain is: 62, 72, 76, 80, B, 68, 78, 82, 60; and the sequence of the objects in the target chain is: 54, 64, 74, 78, 66.

Figure 5F:
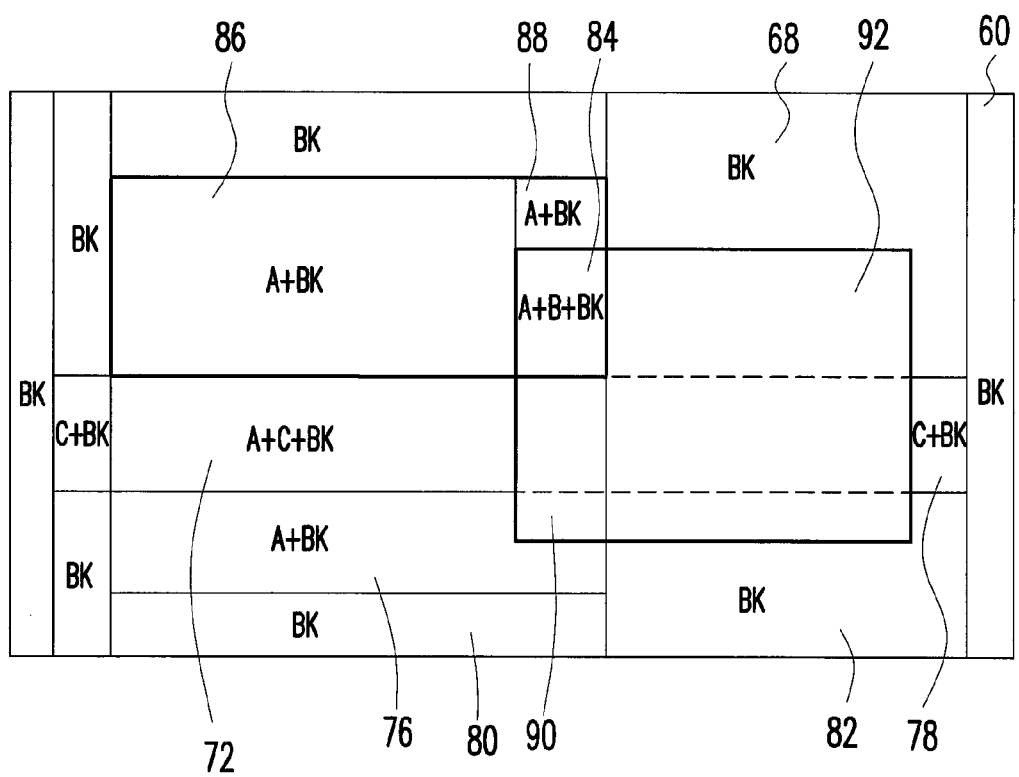

Next, referring to FIG. 5E and FIG. 5F together, the object 62 which is now at the first position of the source chain is selected as the target object, the object B is found by successively searching for the overlapped object of the target object in the source chain. An overlapping area 84 and non-overlapping areas 86, 88, 90 and 92 are defined based on positions of the object 62 and the object B. After the overlapping area 84 (i.e. A+B+BK) is blended, the overlapping area 84 and the non-overlapping areas 86, 88, 90 and 92 are inserted back into the source chain as new objects. At this time, the sequence of the objects in the source chain is: 86, 72, 76, 80, 88, 84, 90, 68, 92, 78, 82, 60; and the sequence of the objects in the target chain is: 54, 64, 74, 78, 66.

Figure 5G:
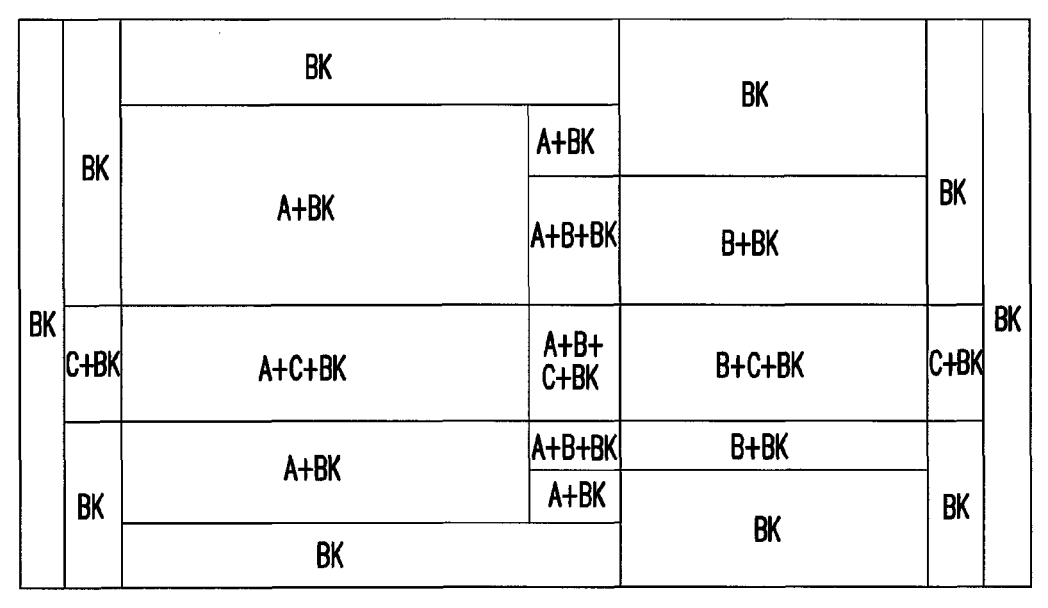

Next, the object 86 which is now at the first position of the source chain is selected as the target object, and the overlapped object of the target object in the source chain is successively searched. Since no other objects are overlapped with the object 86, the object 86 may be moved to the target chain. At this time, the sequence of the objects in the source chain is: 72, 76, 80, 88, 84, 90, 68, 92, 78, 82, 60; and the sequence of the objects in the target chain is: 54, 64, 74, 78, 66, 86. The above steps are repeated until all objects in the source chain are moved to the target chain. As a result, a dividing result as shown in FIG. 5G may be obtained.

The objects of the target chain are placed into the memory after being sorted, divided and blended using the rendering method of the invention. Therefore, the electronic device does not need to repeatedly reading/writing the images of the overlapping area when rendering the entire image. The amount of data for reading/writing memory may be reduced to:

1. Rendering the background BK: writing 1920*1080=207360;

2. Rendering the object A: reading 1000*900 for once, which is a total of 1000*900=900000;

3. Rendering the object B: reading 750*800 for once, which is a total of 750*800=600000;

4. Rendering the object C: reading 1775*340 for once, which is a total of 1775*340=603500;

As stated above, the amount of data for reading/writing memory is 4177100, which is only a half of the traditional method.

It should be noted that, related functionalities of the sorting module 11, searching module 12, blending module 13 and rendering module 14 may be achieved by using general programming languages (e.g. C or C++), hardware description languages (e.g. Verilog HDL and VHDL) or other suitable programming languages. The resulting software may be disposed to any known computer-accessible medias, such as magnetic tapes, semiconductors, magnetic disks or compact disks (e.g. CD-ROM and DVD-ROM), or may be transmitted through Internet, wired communication, wireless communication or other communication media, and used by the computer to gain an access to the programming codes. In addition, the apparatus and method of the invention may be implemented through the combination of hardware and software. Therefore, the invention is not limited by the embodiments disclosed above, and variations of this invention are defined within the scope of the following claims and their equivalents.

Based on the above, the method and the apparatus for rendering overlapped objects of the invention sorts a plurality of objects according to the rendering properties of the objects, searches for the overlapped objects, blends the overlapped objects found, and then places the same into the target chain. Therefore, the objects in the target chain do not require repeating of reading/writing memory, nor further alpha-blending calculation, which may save the calculating resource and the occupied memory bandwidth.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A method for rendering overlapped objects, adapted for rendering a plurality of objects on an electronic device, comprising:
    sorting the objects according to a rendering property of each of the objects, and placing the sorted objects to a source chain, wherein at least part of the objects placed in the source chain are overlapped to each other;
    selecting a target object from the objects in the source chain, and successively searching for a next object in the source chain which is an overlapped object to the target object;
    moving the target object to a target chain and removing the target object in the source chain if the overlapped object is not found;
    generating a blending object by blending an overlapping area of the target object and the overlapped object according to an alpha-blending property of the target object and the overlapped object, dividing an area of the target object and the overlapped object into the overlapping area of the target object and the overlapped object and a plurality of non-overlapping areas of the target object and the overlapped object to obtain a plurality of new objects including the blending object and a plurality of non-overlapping objects, wherein the non-overlapping areas are divided in a sequence to obtain the non-overlapping objects, inserting the blending object and the all non-overlapping objects in the sequence back into the source chain, and removing the target object and the overlapped object from the source chain if the overlapped object is found; and
    rendering the objects in the target chain on the electronic device when all of the objects in the source chain are moved to the target chain and none of the objects are in the source chain.

2. The method for rendering overlapped objects of claim 1, wherein the step of sorting the objects according to the rendering property of each of the objects comprises:
    sorting the objects according to a rendering position of the objects on a first axial direction;
    sorting the objects according to the rendering position of the objects on a second axial direction; and
    sorting the objects according to a rendering sequence of each of the objects.

3. The method for rendering overlapped objects of claim 1, wherein the step of generating the blending object by blending the overlapping area of the target object and the overlapped object according to the alpha-blending property of the target object and the overlapped object comprises:
    directly selecting the overlapping area of the target object or the overlapped object having the alpha-blending property being zero as the blending object, if the alpha-blending property of the target object or the overlapped object is zero.

4. The method for rendering overlapped objects of claim 1, wherein the step of rendering the objects in the target chain on the electronic device when all of the objects in the source chain are moved to the target chain comprises:
    searching a next target object in the source chain again if the source chain has objects not being processed; successively searching for the next object in the source chain which is the overlapped object to the next target object; moving the next target object into the target chain or successively inserting the new objects generated by the next target object and the overlapped object back to the source chain, until all objects in the source chain are moved to the target chain.

5. The method for rendering overlapped objects of claim 1, wherein the step of generating the blending object by blending the overlapping area of the target object and the overlapped object according to the alpha-blending property of the target object and the overlapped object further comprises:
    blending the rendering property of the target object and the rendering property of the overlapped object as the rendering property corresponding to the new object.

6. The method for rendering overlapped objects of claim 1, wherein the step of rendering the objects in the target chain on the electronic device comprises:
    dividing the objects into a plurality of layers according to the rendering property of each of the objects in the target chain; and
    setting a plurality of fixed function pipelines of a graphics engine of the electronic device to respectively render the objects within the layers.

7. The method for rendering overlapped objects of claim 1, wherein the step of rendering the objects in the target chain on the electronic device comprises:
    dividing the objects into a plurality of layers according to the rendering property of each of the objects in the target chain; and
    generating a pixel shader or a fragment shader to respectively render the objects within the layers.

8. The method for rendering overlapped objects of claim 1, wherein the rendering property comprises a source texture, a source texture coordinates and a transparency.

9. The method for rendering overlapped objects of claim 1, wherein the objects are a plurality of windows displayed on a screen of the electronic device.

10. An apparatus for rendering overlapped objects, comprising:
    a processor configured for executing a plurality of modules comprising:
    a sorting module, configured to sort the objects to be displayed on the electronic device according to a rendering property of each of the objects and placing the sorted objects to a source chain, wherein at least part of the objects placed in the source chain are overlapped to each other;

a searching module, connected to the sorting module, configured to select a target object in the objects of the source chain and successively search for a next object in the source chain which is an overlapped object to the target object;

a blending module, connected to the searching module, wherein:

the blending module moves the target object to a target chain and removes the target object in the source chain if the overlapped object is not found by the searching module; and the blending module generates a blending object by blending an overlapping area of the target object and the overlapped object according to an alpha-blending property of the target object and the overlapped object, divides an area of the target object and the overlapped object into the overlapping area of the target object and the overlapped object and a plurality of non-overlapping areas of the target object and the overlapped object to obtain a plurality of new objects including the blending object and a plurality of non-overlapping objects, wherein the non-overlapping areas are divided in a sequence to obtain the non-overlapping objects, inserts the blending object and the all non-overlapping objects in the sequence back into the source chain, and removes the target object and the overlapped object in the source chain if the overlapped object is found by the searching module; and a rendering module, connected to the blending module, configured to render the objects in the target chain on the electronic device when all of the objects in the source chain are moved to the target chain by the blending module and none of the objects are in the source chain.

11. The apparatus for rendering overlapped objects of claim 10, wherein the sorting module comprising:

sorting the objects according to a rendering position of the objects on a first axial direction;

sorting the objects according to the rendering position of the objects on a second axial direction; and sorting the objects according to a rendering sequence of each of the objects.

12. The apparatus for rendering overlapped objects of claim 10, wherein the blending module directly selects the overlapping area of the target object or the overlapped object having the alpha-blending property being zero as the blending object when the alpha-blending property of the target object or the overlapped object is zero.

13. The apparatus for rendering overlapped objects of claim 10, wherein when the blending module determines that the source chain has objects not being processed, the searching module searches a next target object in the source chain again and successively searches for the next object in the source chain which is the overlapped object to the next target object so as to move the next target object into the target chain or successively insert the new objects generated by the next target object and the overlapped object back into the source chain, until all objects in the source chain are moved to the target chain.

14. The apparatus for rendering overlapped objects of claim 10, wherein the blending module blends the rendering property of the target object and the rendering property of the overlapped object as the rendering property corresponding to the new object.

15. The apparatus for rendering overlapped objects of claim 10, wherein the rendering module divides the objects into a plurality of layers according to the rendering property of each of the objects in target chain and sets a plurality of fixed function pipelines of a graphics engine of the electronic device to respectively render the objects within the layers.

16. The apparatus for rendering overlapped objects of claim 10, wherein the rendering module divides the objects into a plurality of layers according to the rendering property of each of the objects in target chain and generates a pixel shader or a fragment shader to respectively render the objects within the layers.

17. The apparatus for rendering overlapped objects of claim 10, wherein the rendering property comprises a source texture, a source texture coordinates and a transparency.

18. The apparatus for rendering overlapped objects of claim 10, wherein the objects are a plurality of windows displayed on a screen of the electronic device.

19. A method for rendering overlapped objects, adapted to a computer system, comprising:

sorting a plurality of windows to be displayed on the computer system according to a rendering property of each of the windows and placing the sorted windows to a source chain, wherein at least part of the windows placed in the source chain are overlapped to each other;

selecting a target window from the windows in the source chain, and successively searching for a next window in the source chain which is an overlapped window to the target window;

moving the target window to a target chain and removing the target window in the source chain if the overlapped window is not found;

generating a blending object by blending an overlapping area of the target window and the overlapped window according to an alpha-blending property of the target window and the overlapped window, dividing an area of the target window and the overlapped window into the overlapping area of the target window and the overlapped window and a plurality of non-overlapping areas of the target window and the overlapped window to obtain a plurality of new windows including the blending object and a plurality of non-overlapping objects, wherein the non-overlapping areas are divided in a sequence to obtain the non-overlapping objects, inserting the blending object and the all non-overlapping objects in the sequence back into the source chain, and removing the target window and the overlapped window form the source chain if the overlapped window is found; and rendering the windows in the target chain on the electronic device when all of the windows in the source chain are moved to the target chain and none of the windows are in the source chain.

* * * * *